United States Patent [19]

Krajewski

[11] Patent Number: 5,302,337

[45] Date of Patent: Apr. 12, 1994

[54] METHOD FOR MAKING A COATED GAS-ASSISTED INJECTION MOLDED ARTICLE

[75] Inventor: Brian A. Krajewski, Grand Rapids, Mich.

[73] Assignee: Cascade Engineering, Inc., Grand Rapids, Mich.

[21] Appl. No.: 76,468

[22] Filed: Jun. 11, 1993

[51] Int. Cl.⁵ .................. B29C 45/16; B29C 45/00
[52] U.S. Cl. ................... 264/513; 264/572; 264/129; 264/230; 264/342 R
[58] Field of Search ............. 264/513, 516, 572, 129, 264/230, 342 R

[56] References Cited

U.S. PATENT DOCUMENTS

| | | |
|---|---|---|
| 3,125,242 | 3/1964 | Davis . |
| 3,443,001 | 5/1969 | Adair et al . |
| 3,460,951 | 8/1969 | Heyl ........................ 264/230 |
| 3,509,596 | 5/1970 | Shaw et al. . |
| 3,558,751 | 1/1971 | Santelli . |
| 3,841,349 | 10/1974 | Todd . |
| 4,101,617 | 7/1978 | Friederich ................ 264/572 |
| 4,297,155 | 10/1981 | Jervis ........................ 264/230 |
| 4,740,150 | 4/1988 | Sayer . |
| 4,990,083 | 2/1991 | Bernhardt ................ 264/572 |
| 5,173,241 | 12/1992 | Shibuya et al. .......... 264/572 |
| 5,186,884 | 2/1993 | Hendry .................... 264/572 |

FOREIGN PATENT DOCUMENTS

| | | | |
|---|---|---|---|
| 57-14968 | 3/1982 | Japan ........................ 264/572 |
| 1-202412 | 8/1989 | Japan ........................ 264/572 |
| 1-202413 | 8/1989 | Japan ........................ 264/572 |

*Primary Examiner*—Catherine Timm
*Attorney, Agent, or Firm*—Varnum, Riddering Schmidt & Howlett

[57] ABSTRACT

A gas-assisted injection molding article suitable for plating and a method for plating the article is disclosed. A sleeve is selectively mounted on an upstanding gas injection stud formed on the molded article. The sleeve seals an aperture which extends through the sidewall of the gas injection stud to the hollow interior of the molded article. The sleeve is preferably formed of a heat shrinkable thermoplastic. After the sleeve has been mounted to the article, the sleeve is subjected to a source of heat such that it retracts and is securely mounted to the gas injection stud. With the aperture sealed, the article can now be submerged in a suitable plating bath or other liquid medium.

10 Claims, 3 Drawing Sheets

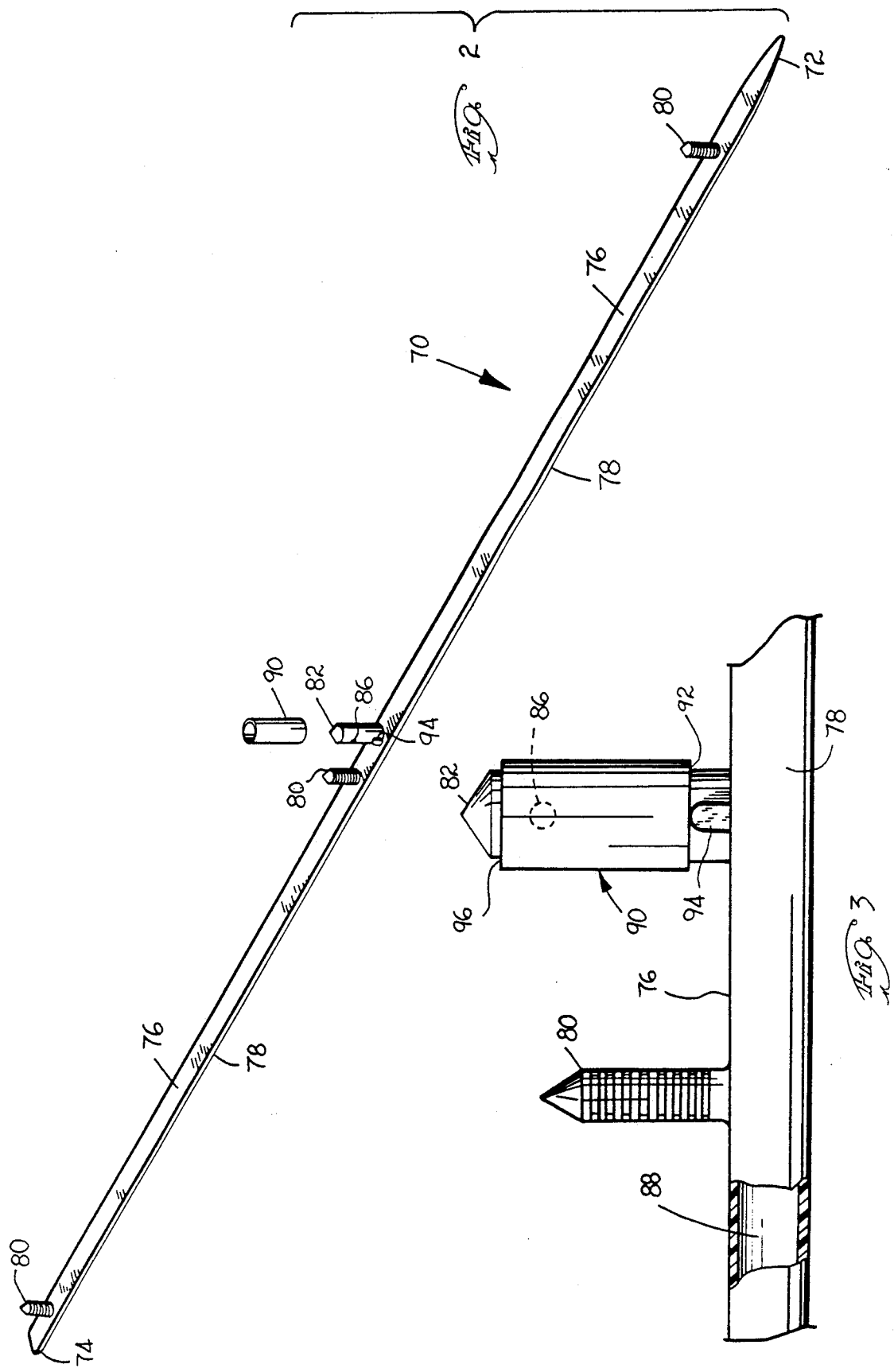

METHOD FOR MAKING A COATED GAS-ASSISTED INJECTION MOLDED ARTICLE

BACKGROUND OF THE INVENTION

1. Field of the Invention

This invention relates to coating of gas-assisted injection molded articles and, more particularly, to a gas-assisted injection molded article suitable for plating and to a plating process for a gas-assisted injection molded article.

2. Description of Related Art

Plastic molded articles have been produced by a process known as gas-assisted injection molding. In this process, molten thermoplastic material is forced from an injection molding machine through a sprue to a plastic flow channel or runner and ultimately into the mold cavity of a mold. A gas injection nozzle is mounted in the plastic flow channel or the mold cavity to inject pressurized fluid or gas into the flow of molten thermoplastic material. The pressurized gas forces the flow of molten thermoplastic material to the far reaches of the mold cavity and results in the creation of an article which is at least hollow in part.

In producing gas-assisted molded articles such as automobile molded trim articles, a gas injection stud extends perpendicular to the main body of the molded article and provides the flow path between the plastic flow channel and the mold cavity. When the molded article is removed from the mold cavity, the gas injection stud extends outwardly from the hollow molded article. The gas injection stud is hollow and is in fluid communication with the hollow interior of the molded article. In addition, the gas injection stud has formed in the sidewall thereof an aperture through which pressurized gas is conveyed to the interior of the article during the molding process. The trim pieces are plated which requires immersion in a plating bath and a rinse bath. If the gas injection stud aperture is not plugged prior to submersion, the liquid plating solution would enter the hollow interior of the molded article through the hollow stud and the aperture formed in the stud. The plating solution within the article can leak from the article during subsequent operations and contaminate rinse baths or even corrode the painted surface of the vehicle to which the trim piece is mounted. Therefore, it is desirable to seal the aperture in the stud prior to any plating or painting operations to which the molded articles are subjected. After the molded article has been painted or plated, then the stud can be broken off and discarded.

One solution to the problem of sealing the gas injection stud has been to frictionally mount a plastic cap on the end of the stud. Unfortunately, it is not uncommon for these caps to fall off or be inadvertently removed during handling prior to the plating operation. Therefore, these caps have proved to be an inadequate solution to the problem of sealing the gas injection stud aperture during plating and painting operations.

SUMMARY OF INVENTION

The invention comprises a gas-assisted injection molded article suitable for plating. The article has a hollow interior through at least a portion of the molded article. A gas injection stud is mounted to the molded article and comprises a sidewall having a top edge and a bottom edge. The gas injection stud is hollow throughout at least a portion thereof and the hollow portion of the gas injection stud is in fluid communication with the hollow interior of the molded article. An aperture is formed in the sidewall of the gas injection stud and the aperture is in fluid communication with the hollow portion of the gas injection stud. A hollow sleeve formed of a shrinkable material is securely mounted to the sidewall of the gas injection stud. The sleeve seals the aperture. The sleeve is received on the stud sidewall and then shrunk to securely mount the sleeve to the sidewall of the stud. The gas injection stud is effectively sealed from the outside environment when the sleeve is received and shrunk onto the gas injection stud.

In the preferred embodiment, the sleeve is formed of a heat-shrinkable thermoplastic material and the sleeve is shrunk by subjecting it to a source of heat.

In another embodiment, the gas injection stud is integrally molded to the molded article.

In yet another embodiment, the gas injection stud is adapted to be broken off from the molded article adjacent the bottom edge of the gas injection stud after the article has been plated.

In still another embodiment, the molded article further comprises a stop mounted to the bottom edge of the sidewall of the gas injection stud. The stop is adapted to limit the length of the hollow sleeve which is received on the gas injection stud. Preferably, the sleeve is telescopically mounted on the gas injection stud and the inside diameter of the sleeve is greater than the outside diameter of the gas injection stud prior to shrinking of the sleeve. The inside diameter of the sleeve is substantially equal to the outside diameter of the stud after shrinking of the sleeve.

In one embodiment, the top edge of the sleeve is shorter than the sidewall of the stud and extends to a point short of the top edge of the gas injection stud after the sleeve has been shrunk onto the stud.

Preferably, the molded article comprises molded automobile trim.

The invention also includes a method for coating a gas-assisted injection molded article comprising the steps of providing a pressurized supply of molten thermoplastic material and pressurized fluid to a mold cavity to form a molded article. The molded article has at least a partial hollow interior and a gas injection stud having at least a partially hollow interior in fluid communication with the hollow interior of the molded article. A hollow runner is connected to the sidewall of the gas injection stud. Next, the molded article and gas injection stud are cooled and then removed from the cavity. The hollow runner is separated from the gas injection stud, resulting in the formation of an aperture in the sidewall of the gas injection stud. The aperture is in fluid communication with the hollow interior of the article and the hollow interior of the gas injection stud. A sleeve formed of a selectively shrinkable material is mounted to the sidewall of the gas injection stud to cover the aperture. Next, the sleeve is shrunk tightly onto the sidewall of the gas injection stud such that the sleeve seals the aperture and prevents the flow of fluid into and out of the hollow interior of the molded article. Finally, the molded article and gas injection stud are immersed in a suitable coating liquid. Preferably, this coating liquid comprises a plating bath.

In one embodiment, the gas injection stud is separated from the molded article after removal from the plating bath and a rinse bath.

Preferably, the sleeve is formed of a heatshrinkable thermoplastic material and the method further comprises the step of heating the sleeve to shrink the sleeve to the gas injection stud.

BRIEF DESCRIPTION OF THE DRAWINGS

The invention will now be described with reference to the drawings wherein:

FIG. 2 is a perspective assembly view of a gas-assisted injection molded article and the gas-channel cover according to the invention;

FIG. 3 is a partial side-elevational view of the molded article shown in FIG. 2 and illustrating the gas channel cover mounted on the gas injection stud.

DESCRIPTION OF THE PREFERRED EMBODIMENTS

Figure 1:
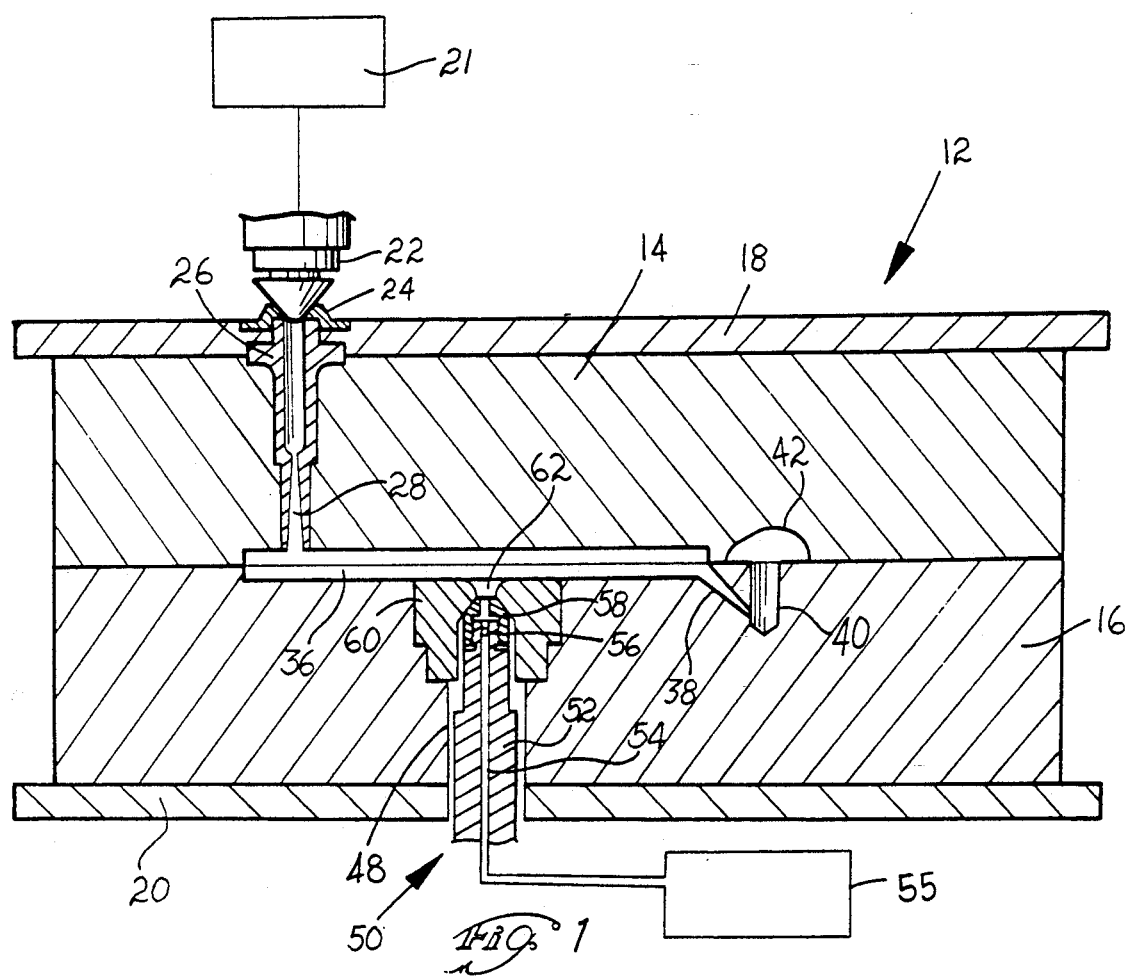
FIG. 1 is a cross sectional view of a mold suitable for use in producing gas-assisted injection molded articles according to the invention.

Referring now to the drawings and to FIG. 1 in particular, a mold 12 suitable for use in producing gas-assisted injection molded articles according to the invention is shown. The mold 12 comprises a top mold half 14 which selectively mates with a bottom mold half 16. The mold halves 14, 16 are mounted between a top platen 18 and a bottom platen 20 and are mounted for reciprocal movement with respect to each other.

The mold 12 receives a flow of molten thermoplastic material from an injection molding machine 21 through an injection molding machine nozzle 22. The nozzle 22 is selectively mounted in a nozzle seat 24 formed in the top platen 18. The opening of the nozzle 22 is in fluid communication with a sprue 26 which is mounted in the top mold half 14. A sprue channel 28 extends through the sprue 26 from a nozzle seat 24 to a runner 36. The runner 36 extends along the interface of the mold halves 14, 16 and extends from the base of the sprue 26 at one end to a flow channel 38 at the other end. The flow channel 38 extends from the runner 36 to a gas injection stud cavity 40. The gas injection stud cavity 40 is in turn in fluid communication with the mold cavity 42. Preferably, the flow channel 38 engages the gas injection stud cavity 40 at a point intermediate the top and bottom ends of the gate stud cavity 40.

In operation, molten thermoplastic material is injected under pressure from the injection molding machine 21 to the mold cavity 42 by passing through the nozzle 22 into the sprue 26. From the sprue 26, the molten thermoplastic material flows into the runner 36 to the flow channel 38. Next, the molten thermoplastic material passes from the flow channel 38 into the gas injection stud cavity 40 and ultimately into the mold cavity 42.

A gas nozzle 50 is retractably mounted in a bore 48 formed in the bottom half 16 of the mold 12. The body 52 of the nozzle 50 has a bore 54 formed therein which is in fluid communication with a source of pressurized gas 55. A non-return valve comprising a ball 56 and a screw on cap 58 is mounted to the end of the nozzle 50. The non-return valve allows the flow of pressurized gas from the gas source 55, through the nozzle bore 54 into the runner 36 but prevents the flow of molten thermoplastic material into the nozzle 50. The cap 58 of the nozzle 50 is received in a tapered seat 60 immediately adjacent to the runner 36. The seat 60 has an opening 62 formed therein to permit the free flow of gas from the nozzle 50 into the runner 36. An example of a nozzle suitable for use according to the invention is disclosed in U.S. Pat. No. 4,740,150 to Sayer, issued Apr. 26, 1988.

During a typical molding cycle, molten thermoplastic material is injected from the injection molding machine 21 through the sprue 26 into the runner 36. After the flow of molten thermoplastic material has begun, pressurized fluid such as gas is injected into the flow of molten thermoplastic material through the nozzle 50. The molten thermoplastic material and gas flow from the runner 36 through the flow channel 38 into the gas injection stud cavity 40 and ultimately into the mold cavity 42. The molten thermoplastic solidifies along the sides of the mold cavity 42, gas injection stud cavity 40, flow channel 38 and runner 36, and the gas forces the molten thermoplastic through the center of the cavity, leaving a hollow mold cavity 42, a hollow gas injection stud cavity 40 and a hollow flow channel 38. When the prescribed amount of molten thermoplastic material has been injected and the molded article has been allowed to cool to a rigid state, then the source of pressurized gas within the runner 36 and mold cavity 42 is released by retracting the nozzle 50 from the seat 60. The pressurized gas is vented from the mold 12 through the annular space between the nozzle 50 and the bore 48 in the bottom half of the mold 16. When the mold halves 14 and 16 are separated from each other, the scrap plastic portions in the sprue channel 28, the runner 36 and the flow channel 38 separate from the plastic in the gas injection stud cavity 40 and the mold cavity 42.

FIGS. 2 and 3 depict a typical molded article produced with the gas-assisted injection molding apparatus described above. The molded trim article 70 has a hollow interior 88 as a result of the gas-assisted injection molding operation. In this embodiment, the molded article comprises a piece of molded trim 70 having a tapered leading edge 72, a flat trailing edge 74, a flat mounting surface 76, an arcuate exterior surface 78 and an upstanding gas injection stud 82 integrally molded to the mounting surface 76. Preferably, a plurality of integrally molded threaded studs 80 extend outwardly from the mounting surface 76. The threaded studs 80 are received in apertures formed in a body panel (not shown) of an automobile for securing the molded trim 70 to the body panel.

The gas injection stud 82 extends outwardly from the mounting surface 76 of the molded trim article 70. When the molded trim article 70 is removed from the mold 12, the trim 70 is separated from the scrap contained in the runner 36 and flow channel 38 by breaking the rigid plastic at the junction between the gas injection stud cavity 40 and the flow channel 38. When the scrap is broken away from the rigid gas injection stud 82, an aperture 86 extending from the outer surface of the gas injection stud 82 to the hollow interior of the gas injection stud 82 is created. The aperture 86 creates a fluid flowpath between the outside environment and the hollow interior of the gas injection stud 82 and the hollow interior 88 of the molded trim article 70. Therefore, if the molded trim article 70 were submerged in a plating solution or a prepatory bath, then the liquid would enter the hollow interior 88 of the molded trim article 70 through the aperture 86 and the hollow gas injection stud 82. In order to achieve an acceptable coating on the trim article and to prevent subsequent leaking of residual liquid from the hollow interior, it is necessary to seal the interior of the hollow article and the gas injection stud 82 from the environment at the aperture 86.

The sleeve 90 can be used to seal the hollow interior 88 from liquids or other media in a variety of post molding operations. The hollow interior 88 of the molded trim article 70 is sealed from the environment for post molding operations such as plating, painting, power washing, etching and cleaning by a cover or sleeve 90 which is selectively and telescopically mounted on the gas injection stud 82. The bottom edge 92 of the sleeve 90 abuts a pair of stops 94 mounted at the base of the gas injection stud 82 to limit the length of the sleeve 90 which is received on the gas injection stud 82. Preferably, one stop 94 is mounted on each side of the gas injection stud 82. The top edge 96 of the sleeve 90 is preferably immediately adjacent the top edge of the gas injection stud 82. When mounted in this manner, the sleeve surrounds the body of the stud 82 including the aperture 86 of the stud 82.

The sleeve 90 is formed of a material which is selectively shrinkable from an initial state to a reduced state. Preferably, the sleeve 90 is formed of a thin-walled, heat-shrinkable thermoplastic tubing having an initial inside diameter larger than the outside diameter of the gas injection stud. The tubing is mounted on the gas injection stud and then subjected to heat to shrink the sleeve 90 onto the gas injection stud 82. After shrinking, the sleeve 90 is securely mounted to the stud 82. An example of a suitable heat-shrinking tubing for use according to the invention is known as HSTT25.651N manufactured by Panduit Corporation of Tinley Park, Illinois. Therefore, the sleeve 90 effectively seals the interior 88 of the molded article to prevent liquids such as cleaning baths or plating fluids from entering the hollow interior of the molded article 70.

Figure 4:
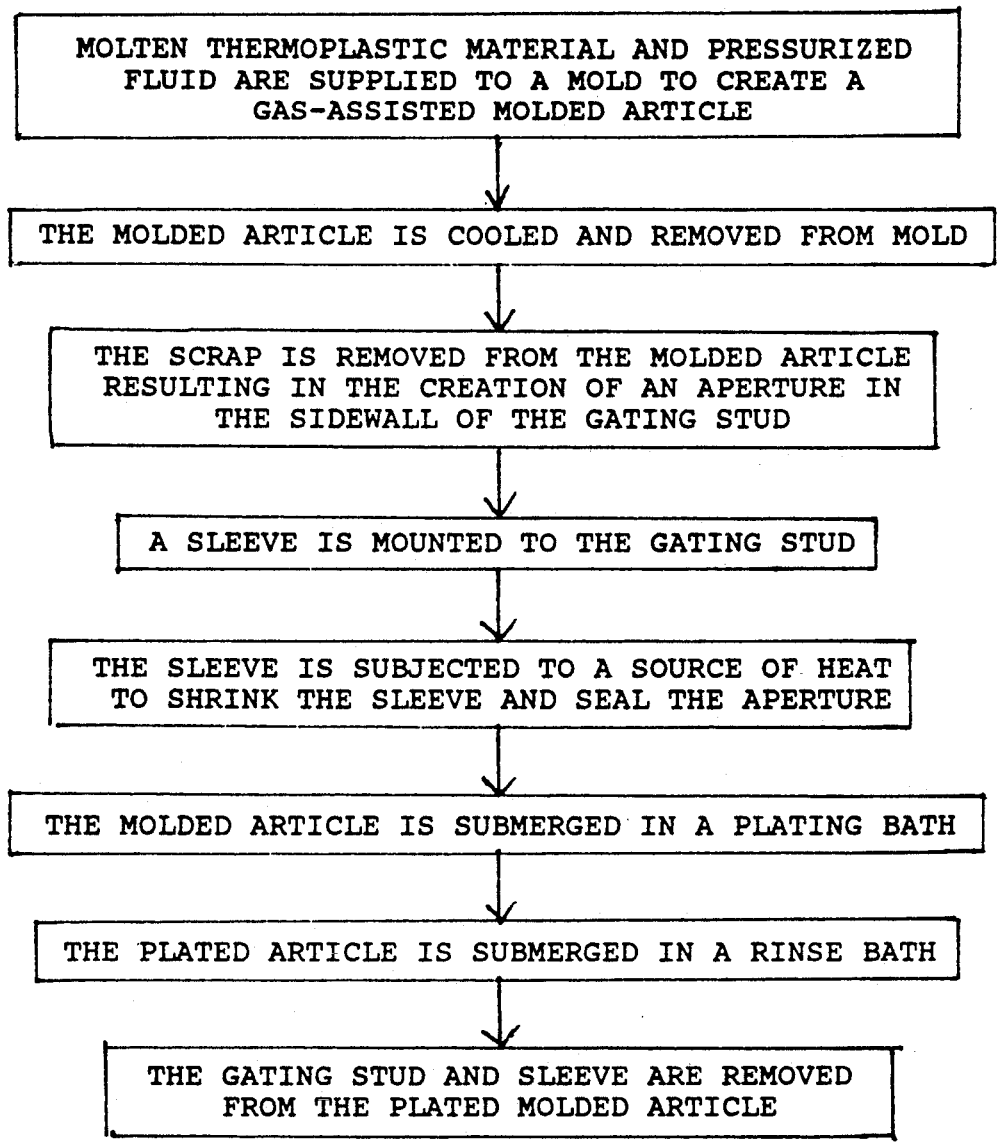
FIG. 4 is a flow diagram of a method for plating a gas-assisted injection molded article according to the invention.

FIG. 4 shows a flow diagram for the method of making and plating the thermoplastic article according to the invention. The method comprises the step of first molding the gas-assisted article by supplying molten thermoplastic material and pressurized fluid to the mold. Next, the molded article is cooled and removed from the mold. Upon removal, the scrap is broken away from the molded article at the junction between the gas injection stud and the flow channel. This results in the creation of an aperture in the sidewall of the gas injection stud. Next, the sleeve is mounted on the gas injection stud and the sleeve is subjected to a source of heat. The heat-shrinkable sleeve shrinks around the gas injection stud and seals the aperture. Next, the molded article is submerged in a suitable plating bath. After a sufficient layer of plating material is adhered to the article, the article is removed from the plating bath and submerged in a rinse bath. Finally, the molded article is removed from the rinse bath and the gas injection stud and sleeve are broken away from the molded article. Alternatively, the gas injection stud 82 and sleeve 90 can remain mounted to the article for the life of the article.

The process described in FIG. 4 can be modified for a painting operation. In this process, the article would be submerged in a cleansing bath immediately after the sleeve has been shrunk to the gas injection stud. Upon removal from the cleansing bath the article would be painted and the gas injection stud and sleeve can be removed as described above.

While the focus of the preferred embodiment has been to seal the hollow interior of the molded trim article for plating and painting operations, the heat-shrinkable sleeve according to the invention can be utilized for any process wherein it is desired to protect the hollow interior of a gas-assisted injection molded article from the outside environment. In addition, it is not a requirement of the invention that the stud and sleeve be broken off from the molded article after the post-molding processes are complete. The sleeve and stud assembly can be left on the molded article to protect the hollow interior of the article from the outside environment for the life of the molded article.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A method for coating a gas assisted injection molded article comprising the steps of;
   providing a pressurized supply of molten thermoplastic material and a pressurized supply of fluid to a mold cavity to form a molded article having at least a partial hollow interior, a gas injection stud having at least a partially hollow interior in fluid communication with the hollow interior of the molded article and a hollow runner connected to a sidewall of the gas injection stud;
   cooling the molded article and gas injection stud;
   removing the molded article and gas injection stud from the cavity;
   separating the hollow runner from the gas injection stud, resulting in the formation of an aperture in the sidewall of the gas injection stud, the aperture being in fluid communication with the hollow interior of the article and the hollow interior of the gas injection stud;
   mounting a sleeve formed of a selectively shrinkable material to the sidewall of the gas injection stud to cover the aperture;
   shrinking the sleeve tightly onto the sidewall of the gas injection stud such that the sleeve seals the aperture and prevents the flow of fluid into and out of the hollow interior of the molded article; and
   immersing the molded article and gas injection stud in a suitable coating liquid.

2. A method according to claim 1 wherein the coating liquid comprises a plating bath.

3. A method according to claim 2 further comprising a step of removing the sleeve and gas injection stud from the molded article after immersion in the plating bath.

4. A method according to claim 3 further comprising a step of submerging the molded article in a cleaning bath, and then separating the gas injection stud from the molded article.

5. A method according to claim 3 wherein the sleeve is formed from a heat-shrinkable thermoplastic material and further comprising the step of heating the sleeve to shrink the sleeve onto the stud.

6. A method according to claim 1 wherein the sleeve is formed from a heat-shrinkable thermoplastic material and further comprising the step of heating the sleeve to shrink the sleeve onto the gas injection stud.

7. In a method for manufacturing a gas-assisted injection molded article having a hollow interior comprising the steps of;
- providing a pressurized supply of molten thermoplastic material and a pressurized supply of fluid to a mold cavity to form a molded article having at least a partially hollow interior, a gas injection stud having at least a partially hollow interior in fluid communication with the hollow interior of the molded article and a hollow runner connected to a sidewall of the gas injection stud;
- cooling the molded article and gas injection stud;
- removing the molded article and gas injection stud from the cavity;
- separating the hollow runner from the gas injection stud, resulting in the formation of an aperture in the sidewall of the gas injection stud, the aperture being in fluid communication with the hollow interior of the article and the hollow interior of the gas injection stud; and
- subjecting the molded article to a liquid medium to finish the surface thereof, the improvement which comprises the steps of;
- mounting a sleeve formed of a selectively shrinkable material to the sidewall of the gas injection stud to cover the aperture; and thereafter
- shrinking the sleeve tightly onto the sidewall of the gas injection stud such that the sleeve seals the aperture an prevents the flow of fluid into and out of the hollow interior of the molded article prior to subjecting the molded article to the liquid medium.

8. A method according to claim 7 wherein the step of subjecting the molded article to a source of liquid comprises a step of plating, painting, cleaning or power washing the article.

9. A method according to claim 8 further comprising a step of removing the sleeve and gas injection stud from the molded article after subjecting the molded article to the source of liquid.

10. A method according to claim 7 wherein the sleeve is formed from a heat-shrinkable thermoplastic material and further comprising a step of heating the sleeve to shrink the sleeve onto the gas injection stud.

* * * * *